Dec. 27, 1966     P. G. GRIMES     3,294,378
TWO-PHASE CONTACTOR DISKS
Filed Dec. 9, 1963

Inventor
Patrick G. Grimes
By Robert D. Benson
Attorney

3,294,378
TWO-PHASE CONTACTOR DISKS
Patrick G. Grimes, Milwaukee, Wis., assignor to Allis-Chalmers Manufacturing Company, Milwaukee, Wis.
Filed Dec. 9, 1963, Ser. No. 328,916
4 Claims. (Cl. 261—92)

This invention relates generally to what is known as two-phase contactors. More specifically, this invention relates to disklike members used in two-phase contactors.

The two-phase contactor generally utilizes a plurality of elements which are dipped into a liquid, exposed to gas and then returned into the liquid. This type of the device can also be used with two immiscible liquids. The two-phase contactor is used as a means to selectively absorb into or remove from a fluid certain elements or gases. Examples of successful applications of this type of a device are: removing dust particles from an air stream and oxygenating liquids.

Two-phase contactors frequently utilize a plurality of disks which are rotated into a liquid and then exposed to a gas. As they are being rotated, the surface of the disks pick up a thin film of liquid. Hence, these disks rotate slowly to avoid throwing the liquid off by centrifugal force. As a result, the surface of the liquid film is usually saturated with the gas passing over the exposed portion of the disk within a very short time after the film emerges from the liquid. It has been recognized that a greater amount of gas can be absorbed on these disks if the amount of liquid retained on the disks and exposed to the gas is increased.

Another factor that has been observed is that if the flow path of the liquid on the disk can be elongated, a greater surface of liquid on the disk can be exposed to the gas and a greater volume of gas can be absorbed into the liquid being treated.

Generally, there are two forms of flow of the film which can occur on the disk. One form of flow is laminar flow in which the top surface of the liquid flows faster than the lower layers and hence exposes the second or lower layers of liquid. The other form being a turbulent flow where there is a type of rolling of the top surface of liquid as it flows off of the contactor disks. This also exposes more surface of the film on the disk. Hence, elongating the flow distance with either type of flow will increase the film surface exposed to the gas phase.

This invention concerns a unique way of picking up on a disklike member and inducing turbulent flow of the liquid on the member so as to expose a greater surface of liquid to the gas phase of the contactor and thereby produce a more efficient contactor. Turbulent type of flow is much more effective then laminar flow in certain applications for exposing more unsaturated liquid surface to the gas phases of the contactor. To accomplish this result, this invention provides a special screen-like disk-member for the contactor. The member has a plurality of radially extending members and woven members forming a wire mesh. Adjacent radial members form troughs therebetween that help to pick up larger quantities of liquid on the disk and the woven connecting wire induces a rolling cascading turbulent flow along the disk as it rotates through the gas phase.

Therefore, it is the object of this invention to provide a new and improved two-phase contactor.

Another object of this invention is to provide a new and improved disklike member for use in a two-phase contactor.

Another object of this invention is to provide a new and improved rotating member for a two-phase contactor that induces turbulent flow on the member while it is passing through the gas phase of the contactor.

Other objects and advantages of this invention will be apparent from the following description when read in connection with the accompanying drawings, in which.

Figure 1:
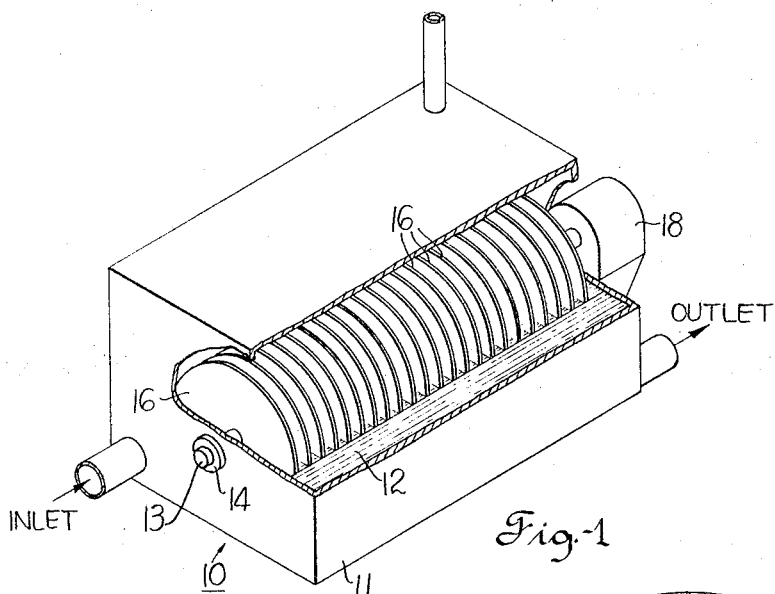
FIG. 1 is an isometric view of a two-phase contactor having disks of this invention.

Referring more specifically to the drawing by characters of reference, the two-phase contactor 10 of this invention is illustrated as a liquid gas contactor having a tank 11 with the bulk liquid 12 to be treated flowing in the lower portion of the tank. A horizontally disposed shaft 13 is rotatably mounted in a pair of spaced apart bearings 14 and a plurality of disks 16 are mounted on the shaft 13 intermediate the bearings 14 for rotation in a substantially vertical plane. The disks are located so that about one-half of each disk is submerged in the bulk liquid to obtain maximum results. A suitable source of power such as the illustrated electric motor 18 is provided for rotating the shaft. Preferably the shaft is rotated at a relatively slow speed to avoid throwing liquid off of the disks by centrifugal force.

As the disks are rotated through the bulk liquid to be treated, some of the bulk liquid adheres to the disks and is carried through and exposed to the gas phase of the contactor. As the portion of the disk out of the water is being rotated, the liquid on the surface tends to flow downwardly slightly due to gravitational force. Since maximum flow of the liquid on the disk is desired in this invention, an attempt is made to lift as much liquid as possible on the disk. Also, the speed of the disk is kept slow enough so that the gravitational force will overcome any tendency of centrifugal force of the disk to throw this liquid radially outward or to neutralize it so that the liquid does not flow at all.

It has been found by experimentation that the surface area exposed to the gas in this type of contactor is saturated with the gas within a very short time after the disk emerges from the bulk liquid. Hence, to increase the amount of gas absorbed in the liquid a larger surface area must be exposed to the gas.

As the liquid on the disk flows along the disk, it exposes additional film surface to the gas phase and more gas is absorbed into the liquid. This is a continuing process and hence the greater distance the liquid flows on the disk before reentering the bulk liquid in the tank, the greater the amount of liquid surface exposed to the gas and the greater the amount of gas absorbed in the liquid.

As mentioned above, there are basically two types of flow which occur in the liquid of the disk. One is what is known as the laminar flow in which the outer surfaces of the liquid flow downwardly at a faster rate than the inner layers of liquid which have a greater adhesion to the surface of the disk. The other type of flow is called the turbulent flow in which the liquid tumbles down the surface of the disk and as it tumbles and rolls it exposes previously submerged surface areas to the gas. In the two-phase contactor such as illustrated in the drawing, both types of flow occur but this invention is primarily concerned with increasing the turbulent flow of liquid on the disks. For example, some of the liquid tends to flow along the surface of the disk in the troughs formed between adjacent radially extending wires. However, as the liquid flows in the troughs, it tumbles over the cross members which results in a turbulent flow. Elongating the flow of liquid along the disk and over the wires exposes more liquid surface to the gas and more gas is correspondingly absorbed into the liquid.

Figure 2:
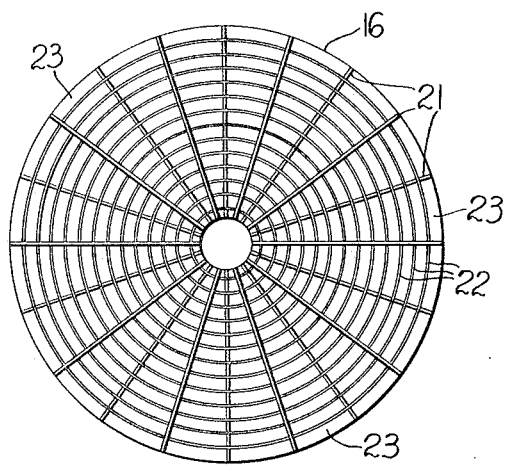
FIG. 2 is a front view of a disk showing the preferred embodiment of this invention.

The disk 16 illustrated in FIGS. 1 and 2 is the preferred embodiment of this invention. The disk 16 is a unique form of a screen and has a plurality of arcuately spaced outwardly extending members 21 and a plurality of radially spaced bridging members 22 connecting the members 21 to form a mesh. Adjacent members 21 form troughs 23 therebetween. These members 21 extend generally toward the center of the disk and are specifically arranged so that when they emerge from the bulk liquid in the tank 11, they are in a substantially horizontal position so as to entrap on the disk 16 a greater amount of liquid than would normally adhere to the surface of the disk. As the disk 16 continues to rotate, these members 21 gradually assume and pass through a substantially vertical position. As the members 21 are rotating toward the vertical position, gravitational forces tend to draw the liquid downwardly through the trough 23 between members 21 toward the center of the disk. The liquid in the troughs 23 cascades over the connecting member 22 resulting in a turbulent flow.

As the member 21 assumes a vertical position all of the liquid in the troughs 23 is flowing downwardly in turbulent flow. As the member 21 passes the vertical midpoint, any liquid which has not flowed all the way to the center of the disk and back to the bulk liquid starts to flow across the trough 23 to the member 21 on the other side of the trough. As the member 21 rotates further to near a horizontal position just prior to reentry into the bulk liquid in the tank 11, the liquid on the disk tends to ride up slightly on that member 21. Other of the liquid on the disk still flows toward the center of the disk.

The net effect of the disk formation is to elongate the flow path of the liquid on the disk and cause it to remain on the disk for a longer period of time continually exposing more and more liquid surface to the gas. The majority of the liquid flow on the disk 16 is turbulent flow. Hence, more gas is absorbed into the film and returned to the bulk liquid in the tank.

The size and shape of the mesh and troughs on the screen type disk of this invention may be varied to accommodate various types of liquids and materials of the disk. However, it is preferred that the size of the mesh be small enough to enable the liquid being treated to fill in the open areas of the screen and combine with the liquid in adjacent meshes and that adhering to the wire of the disk to form a continuous column of liquid. To further enhance the possibility of the liquid forming a continuous column, the wires or members forming the disk can be sandblasted or otherwise treated to increase their wettability. With the liquid on the disk forming a continuous column, gravity acts on the column as a whole and causes it to flow as indicated above. If the disk was not completely wetted by the liquid or the mesh too large, the columns would be discontinuous and flow on the disk would not occur.

Figure 3:
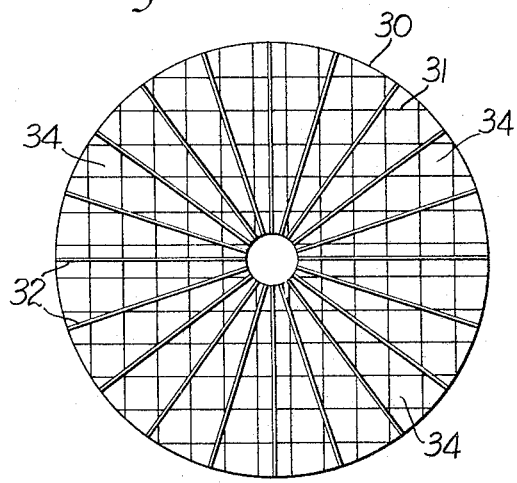
FIG. 3 is a front view of a disk showing an alternate embodiment of this invention.

An alternate form of disk 30 for use in this invention is illustrated in FIG. 3. This disk 30 is made of a conventionally woven wire screen 31 having a plurality of arcuately spaced substantially radially extending wire members 32 mounted on top of the screen 31. The members 32 combine with the screen 31 to form flow controlling troughs 34 therebetween. The troughs 34 help to retain liquid on the disk and then force the liquid on the disk to flow in an elongated path rather than straight downward as it would do in the absence of members 31.

In operation, the liquid, such as water to be treated, flows through the tank 11 by means of the inlet and outlet pipes. If a gas such as atmosphere is used, it is not necessary to enclose the disks. However, if a gas other than atmosphere is to be used, the contactor should be enclosed such as by tank 11 and the gas such as oxygen injected into the enclosure. The disks 16 are rotated slowly within the tank 11 with preferably 40 to 60 percent of their surface in the water. As one of the radial members 21 emerges from the bulk liquid 12, it is in a substantially horizontal position and traps liquid on the trough 23 between adjacent projection 21 in addition to the liquid trapped in the meshes of the disk. As the disk continues to rotate, the projection 21 gradually assumes a vertical position. During this time, the liquid on the disk is flowing in a cascading manner radially inward in the trough 23 between the projection 21 and over the members 22. Other of the liquid is cascading over the projection 21 into the adjacent trough 23. When the projection 21 is in the vertical position, all of the gravitational force on the column of liquid in the adjacent trough 23 is downward and all the liquid tends to flow downwardly in the trough. As the projection 21 passes through the vertical position into the next quadrant, the liquid on the disk tends to flow across the trough 23 but still tends to flow inwardly. By the time the projection is about to reenter the bulk liquid, it is again in a substantially horizontal position and the liquid from the trough 22 is tending to flow over the projection 21 again toward the bulk liquid. Thus, the flow of molecule of water could be described as being picked up in a trough between projections, flowing radially inwardly along the bottom of the trough and over the members 22 and then possibly over adjacent radial member 21. All of this flow is primarily a cascading type flow that continuously exposes new surface of the liquid on the disk. By comparison, if there were no projections the liquid would tend to flow directly to the bulk liquid immediately upon emerging from the liquid and would find the shortest path to the liquid. As was pointed out above, the increased path of travel of the liquid on the disk because of the flow control members 21 causes a greater surface area of liquid to be exposed to the gas resulting in a much higher volume of gas absorbed in the liquid on the disk and returned to the bulk liquid being treated.

Although the operation was explained in detail in relation to the disk 16 of FIGS. 1 and 2, the operation in connection with the other illustrated disk 30 would be substantially the same.

Although only two embodiments of this invention have been illustrated and described, it will be apparent to those skilled in the art that various modifications and changes can be made therein without departing from the spirit of the invention or scope of the appended claims.

Having now particularly described and ascertained the nature of my said invention and the manner in which it is to be performed, I declare that what I claim is:

1. A two-phase contactor comprising a plurality of screens mounted for rotation in vertical planes about a horizontal axis, said screens being located so as to be partially submerged in a liquid to be treated, said screens comprising a plurality of arcuately spaced substantially radially extending members and radially spaced annular members interconnecting said radial members, said radially extending and said annular members forming a mesh of sufficiently small size to retain liquid by surface tension in individual meshes and to combine the liquid in adjacent meshes into a continuous liquid film and said radially extending members elevating liquid as they emerge from said liquid and directing said liquid to flow radially inward under the force of gravity in a cascading manner over said radially spaced annular members and in an elongated path along said screen as said screen is being rotated.

2. A two-phase contactor comprising a plurality of screens mounted for rotation in vertical planes about a horizontal axis, said screens being partially submerged in a liquid to be treated and having the nonsubmerged portion thereof exposed to a gas, said screens comprising a plurality of arcuately spaced radial wire members interwoven with radially spaced bridging wire members interconnecting said radial members, all of said bridging members being woven on the same side of any one of said radial members and on opposite sides of adjacent said radial members to form a plurality of arcuately spaced radially extending troughs on said disk, and means for rotating said screens at a sufficiently low velocity so that said troughs elevate liquid as they emerge from said liquid and direct said liquid to flow radially inward under the force of gravity and tumble across said bridging members in a turbulent flow which exposes greater surface of said liquid to said gas.

3. A two-phase contactor comprising, in combination, a tank, means to circulate a liquid to be treated through said tank, a shaft rotatable about a horizontal axis within said tank, a plurality of generally flat screens disposed in vertical planes secured in axially spaced apart relation on said shaft and positioned to be partially immersed in said liquid, said screens being of sufficiently small mesh so that liquid is retained by surface tension within individual meshes and a continuous film of said liquid is formed as they emerge from said liquid upon rotation of said shaft, said screens including a plurality of arcuately spaced, radially extending wire members adapted to elevate liquid and direct the flow of liquid radially inward as they emerge from said liquid upon rotation of said shaft and a plurality of radially spaced apart bridging wire members interwoven with said radial members to form the mesh of said screens, all of said bridging members being woven on one side of any one said radially extending member and also being woven on opposite sides of radially extending members adjacent said one radially extending member and forming a plurality of arcuately spaced troughs on each said screen, and means for rotating said shaft at a sufficiently slow velocity so that liquid elevated by said radial members flows under the force of gravity along said radial members and tumbles across said bridging members in a turbulent flow which exposes a greater surface of said liquid.

4. A disk for use in a two-phase contactor comprising a screen rotatable in a vertical plane about a horizontal axis, said screen having a plurality of arcuately spaced substantially radially extending wire members interwoven with a plurality of radially spaced bridging wire members, all of said bridging members being woven on the same side of any one of said radially extending members and on opposite sides of adjacent said radially extending members to form a plurality of arcuately spaced troughs on said disk, said interwoven radially extending and bridging wire members forming a sufficiently small mesh to retain liquid by surface tension in individual meshes and to combine the liquid in adjacent meshes into a continuous liquid film on said screen as it is rotated partially immersed in a liquid.

References Cited by the Examiner

UNITED STATES PATENTS

| 1,758,997 | 5/1930 | Bogard | 261—92 |
| 2,169,942 | 8/1939 | Crandall et al. | 261—92 |
| 2,698,287 | 12/1954 | Bowden et al. | 202—175 X |
| 3,229,966 | 1/1966 | Kilgore | 261—92 |

FOREIGN PATENTS 21,708  1/1892  Great Britain.

HARRY B. THORNTON, *Primary Examiner.*

E. H. RENNER, *Assistant Examiner.*